(12) United States Patent
Kim et al.

(10) Patent No.: US 12,075,938 B2
(45) Date of Patent: Sep. 3, 2024

(54) SEPARABLE SCREW AND JUICER USING SAME

(71) Applicant: HUROM CO., LTD, Gyeongsangnam-do (KR)

(72) Inventors: Young Ki Kim, Gyeongsangnam-do (KR); Cha Woo Lee, Gyeongsangnam-do (KR)

(73) Assignee: HUROM CO., LTD., Gyeongsangnam-do (KR)

( * ) Notice: Subject to any disclaimer, the term of this patent is extended or adjusted under 35 U.S.C. 154(b) by 947 days.

(21) Appl. No.: 16/967,782

(22) PCT Filed: Jan. 4, 2019

(86) PCT No.: PCT/KR2019/000158
§ 371 (c)(1),
(2) Date: Aug. 6, 2020

(87) PCT Pub. No.: WO2019/156358
PCT Pub. Date: Aug. 15, 2019

(65) Prior Publication Data
US 2020/0375386 A1    Dec. 3, 2020

(30) Foreign Application Priority Data

Feb. 7, 2018   (KR) .......................... 2020180000605
Feb. 7, 2018   (KR) .......................... 2020180004491

(51) Int. Cl.
*A47J 19/02*   (2006.01)
*A23N 1/02*    (2006.01)
*A47J 19/06*   (2006.01)

(52) U.S. Cl.
CPC .............. *A47J 19/025* (2013.01); *A23N 1/02* (2013.01); *A47J 19/06* (2013.01)

(58) Field of Classification Search
CPC .......... A47J 10/025; A47J 19/06; A47J 19/00; A47J 19/025; A23N 1/003; A23N 1/02; B01F 27/94; B01F 27/941; B01F 27/92
(Continued)

(56) References Cited

U.S. PATENT DOCUMENTS

| 854,745 A | 5/1907 | King |
| 3,866,528 A * | 2/1975 | Montagroni ........... A23N 1/003 |
| | | 100/98 R |

(Continued)

FOREIGN PATENT DOCUMENTS

| CN | 201790542 U | 4/2011 |
| CN | 202760959 U | 3/2013 |

(Continued)

OTHER PUBLICATIONS

International Search Report and Written Opinion dated Apr. 8, 2019 for Application No. PCT/KR2019/000158.
(Continued)

*Primary Examiner* — Reginald Alexander
(74) *Attorney, Agent, or Firm* — Dinsmore & Shohl LLP

(57) ABSTRACT

A separable screw and a juice extractor using the same are disclosed. A separable screw according to an exemplary embodiment of the present invention may include a first module formed with slits by bars on an external circumferential side; and a second module formed with ribs inserted into the slit of the first module; wherein the first module and the second module are detachably coupled, and the rib is inserted into the slit and a gap is formed between the rib and the slit when the second module is inserted into and coupled with the first module.

23 Claims, 12 Drawing Sheets

(58) Field of Classification Search
USPC .......................................... 366/318, 319, 320
See application file for complete search history.

(56) References Cited

U.S. PATENT DOCUMENTS

| | | | |
|---|---|---|---|
| 4,905,586 A * | 3/1990 | Anderson | ............... A23N 1/003 100/98 R |
| 8,047,130 B2 * | 11/2011 | Neto | ....................... A23N 1/003 99/510 |
| 11,291,326 B2 | 4/2022 | Kim | |
| 2017/0273509 A1 | 9/2017 | Wu | |
| 2017/0295982 A1 | 10/2017 | Holzbauer et al. | |
| 2017/0303723 A1 | 10/2017 | Sedlmaier et al. | |

FOREIGN PATENT DOCUMENTS

| | | |
|---|---|---|
| CN | 203885244 U | 10/2014 |
| CN | 204764924 U | 11/2015 |
| CN | 205306708 U | 6/2016 |
| CN | 205568614 U | 9/2016 |
| CN | 205625553 U | 10/2016 |
| CN | 107569082 A | 1/2018 |
| EP | 2891435 A | 8/2015 |
| EP | 3005914 A1 | 4/2016 |
| JP | 2008104564 A | 5/2008 |
| JP | 2017-529926 A | 10/2017 |
| KR | 200210541 Y1 | 1/2001 |
| KR | 1020120012038 A | 2/2012 |
| KR | 1020120012040 A | 2/2012 |
| KR | 1020120332954 A | 4/2012 |
| KR | 1020120042606 A | 5/2012 |
| KR | 1020120050949 A | 5/2012 |
| KR | 200461811 Y1 | 8/2012 |
| KR | 1020120111445 A | 10/2012 |
| KR | 101202775 B1 | 11/2012 |
| KR | 1020130045916 A | 5/2013 |
| KR | 10-1343599 B1 | 12/2013 |
| KR | 2020140001499 U | 5/2014 |
| KR | 1020140115292 A | 9/2014 |
| KR | 200475273 Y1 | 11/2014 |
| KR | 1020150016812 A | 2/2015 |
| KR | 1020150022643 A | 3/2015 |
| KR | 1020150028033 A | 3/2015 |
| KR | 101541829 B1 | 8/2015 |
| KR | 101548561 A | 9/2015 |
| KR | 1020160016368 A | 2/2016 |
| KR | 1020160111739 A | 9/2016 |
| KR | 1020160135664 A | 11/2016 |
| KR | 2020160004213 U | 12/2016 |
| KR | 1020170095641 A | 8/2017 |
| KR | 10-2017-0114507 A | 10/2017 |
| KR | 1020170127754 A | 11/2017 |
| WO | 2011025227 A1 | 3/2011 |
| WO | 2012110825 A1 | 11/2012 |

OTHER PUBLICATIONS

Extended European Search Report dated Sep. 24, 2021 for Application No. EP19750574.6.

* cited by examiner

SEPARABLE SCREW AND JUICER USING SAME

CROSS-REFERENCE TO RELATED APPLICATION

This application claims priority to and the benefit of Korean Patent Application No. 20-2018-0004491 filed in the Korean Intellectual Property Office on Sep. 28, 2018, and Korean Patent Application No. 20-2018-0000605 filed in the Korean Intellectual Property Office on Feb. 7, 2018, the entire contents of which are incorporated herein by reference.

BACKGROUND OF THE INVENTION

(a) Field of the Invention

The present invention relates to a separable screw used in a vertical low-speed juice extractor and a juice extractor using the same. More particularly, the present invention relates to a separable screw having two modules and a juice extractor using the same.

(b) Description of the Related Art

In recent years, interest in health has been increasing in the home, and a use frequency of a juicer having a function of allowing juice to be taken from a juice-extracting target such as vegetables, grains, fruits, or the like, by an individual is increasing.

A general mode of operation of such a juicer is a method in which a juice-extracting target is pressed and squeezed, for example, by using a principle as that of milling soybeans onto a steel plate and squeezing the juice, as disclosed in Korean Patent Registration No. 793852.

For such a purpose, the juice extractor is provided with, a driver providing a torque, a drum housing having a drive shaft receiving the torque from the driver, a screw connected to the drive shaft and formed with a screw spiral to squeeze and crush the juice-extracting target by the screw spiral, and a juice-extracting drum for separating the juice produced by the screw. The driver providing a torque to the juice extractor includes a motor and a speed reducer. The motor is connected to the drive shaft to transmit torque to the screw. For such a purpose, the drive shaft penetrates a lower part of the drum housing and is connected to the screw.

In general, the juice-extracting drum has a mesh structure forming netted holes. In the case of a juice-extracting drum having a mesh structure, there is a problem in that the juice-extracting efficiency is low because it is easily blocked by debris of the juice-extracting target during the juice-extracting process. In addition, because the mesh is densely formed, there is a problem that cleaning to remove the debris of the juice-extracting target on the mesh may be difficult. Although various other filter structures may be supposed, but it is difficult to be applied to a juice extractor of a squeezing scheme using a screw, because such merely performs a simple filtrate function.

In addition, fine circular netted holes were formed in a side of the conventional netted drum to discharge the juice extracted inside the netted drum to the outside. However, if debris caught in netted holes is not fully removed, debris may decay and germs may propagate. In a conventional netted drum structure, cleaning of debris stuck in netted holes is difficult.

The above information disclosed in this Background section is only for enhancement of understanding of the background of the invention, and therefore it may contain information that does not form the prior art that is already known in this country to a person of ordinary skill in the art.

SUMMARY OF THE INVENTION

Technical Problem

An exemplary embodiment of a separable screw and a juice extractor using the same according to the present invention is to solve the above-described problem, and has an object to provide a separable screw where the separable screw is composed of two modules, by which, while the separable screw performs the function of a conventional netted drum, cleaning is easy and the juice-extracting efficiency is improved.

Technical Solution

A separable screw according to an exemplary embodiment of the present invention may include a first module formed with slits by bars on an external circumferential side; and a second module formed with ribs inserted into the slits of the first module; wherein the first module and the second module are detachably coupled, and the rib is inserted into the slit and a gap is formed between the rib and the slit when the second module is inserted into and coupled with the first module.

At least one first spiral protrusion may be formed on an external circumferential surface of the bar, at least one second spiral protrusion may be formed on at least one of the plurality of ribs, and the first spiral protrusion of the bar and the second spiral protrusion of the rib may form a continuous screw spiral when the second module is inserted into and combined with the first module.

A lower portion of the second module may be opened, and an upper portion of the second module may be closed.

A screw shaft may be formed in an inner center of the first module, and a shaft through-hole corresponding to the screw shaft may be formed on an upper surface of the second module such that the screw shaft is fitted.

The screw shaft may be formed as a polygonal shape.

A key protrusion may be formed in an upper portion of the first module, and a key groove into which the key protrusion is coupled may be formed in an upper portion of the second module.

A magnet accommodating portion in which a magnet is disposed may be formed in an upper surface of the second module, and a magnet having opposite polarity to the magnet disposed in the magnet accommodating portion or a magnetic substance may be disposed in an inside of the first module.

A width of the bar may have a shape that narrows toward the center of the radial direction.

A spatial gap may be formed between an interior circumferential surface of the first module and an external circumferential surface of the second module.

A plurality of screw grooves may be formed between the plurality of ribs.

A juice discharge hole may be formed at a lower portion of the screw groove.

A seating groove may be formed on a lower portion of the second module, and a packing may be disposed in the seating groove.

A first step may be formed at a low portion of the bar, and a second step corresponding to the first step may be formed on a lower portion of the rib.

A first bar step may be formed on an upper side of the bar.

A second bar step may be formed on a lower side of the rib.

An inclined portion may be formed by cutting off a side edge adjacent to the slit of the first module.

The bars may include a bar having a relatively narrow width and a bar having a relatively wide width, and a relatively narrow space into which the bar having the relatively narrow width is inserted and a relatively wide space into which the bar having the relatively wide width is inserted are formed between the plurality of ribs may be formed between the plurality of ribs.

The relatively narrow space and the relatively wide space may be periodically formed at predetermined angles along the circumferential direction.

A ring-shaped flange for supporting a distance between the plurality of the ribs may be formed an lower side of the rib.

A juice extractor according to another exemplary embodiment of the present invention may include a separable screw according to any one of claim 1 to claim 19; a drum housing accommodating the separable screw, formed with at least on rib step on an interior circumference in length direction therein, formed with a drum hole on a bottom surface thereof, formed with a juice outlet for discharging juice and a debris outlet for discharging debris with a predetermined spacing, formed with a juice extracting groove fluidly communicated with the juice outlet of the bottom surface thereof, and formed with a debris extracting groove fluidly communicated with the debris outlet radially exterior direction of the juice extracting groove; and a main body including a drive shaft being inserted in the drum hole and transmitting power to the separable screw.

The rib step may include a first rib step having a relatively short length, and a second rib step having a relatively long length.

The juice extracted between the separable screw and the drum housing may be extruded into an inner space of the separable screw through the gap between the rib and the slit, collected in the juice extracting groove, and discharged outside though the juice outlet.

The debris excluding the juices extracted between the separable screw and the drum housing may move downward between the separable screw and the drum housing, flow along the debris extracting groove, and be discharged outside through the debris outlet.

In addition, at least one of the above-described respective solutions may be applied to invent a juice extractor.

Advantageous Effects

According to a separable screw and a juice extractor using the same applied with exemplary embodiments of the present invention and common technical ideas thereof, by forming the separable screw such that two modules may be combined, assembly and disassembly of the two modules is easy, and accordingly, the juice-extracting drum is easy to manufacture and cleaning becomes easy.

In addition, according to the exemplary embodiments of the present invention, it is possible to smoothly transfer the material by screw in the squeezing process, to increase the juice-extracting rate through fine crush and squeeze of the material, and to smoothly insert the material.

In addition, according to the exemplary embodiments of the present invention, by preventing debris from being caught in the juice-extracting drum in the juice-extracting process through the first rib step and the inclined portion formed in the first slit, the problem of debris hindering the flow of the extracted juice may be prevented and thereby the juice-extracting efficiency may be improved.

In addition, according to the exemplary embodiments of the present invention, it is possible to prevent deformation of the juice-extracting drum in the juice-extracting process by forming the juice-extracting drum from a rigid material. Accordingly, it is possible to prevent the slit from being widened, and to maintain a constant interval between slits from which juice is discharged.

In addition, according to exemplary embodiments of the present invention, by combining two modules through coupling of a coupling protrusion and a coupling groove and coupling of a key protrusion and a key groove, a combined position of the two modules may be accurately fixed, and relative rotation and tilting between the two modules in the juice-extracting process may be prevented.

In addition, since the screw rotates at a low speed and squeezes and crushes the material to form juice, instead of the crushing method using a blade rotating at a high speed, there is also a merit that the material's unique taste and nutrition may be preserved.

In addition, since the housing and the screw of the juice-extractor are vertically assembled to the upper side of the driver, the material naturally descends by gravity and rotation of the screw, so the juice-extracting speed is fast and there is no juice accumulation phenomenon, thereby also providing a merit that any kind of vegetables or fruits may be juice-extracted.

Other effects that may be obtained or are predicted by exemplary embodiments will be explicitly or implicitly described in a detailed description of the present invention. That is, various effects that are predicted according to exemplary embodiments will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION OF THE EMBODIMENTS

Figure 1:
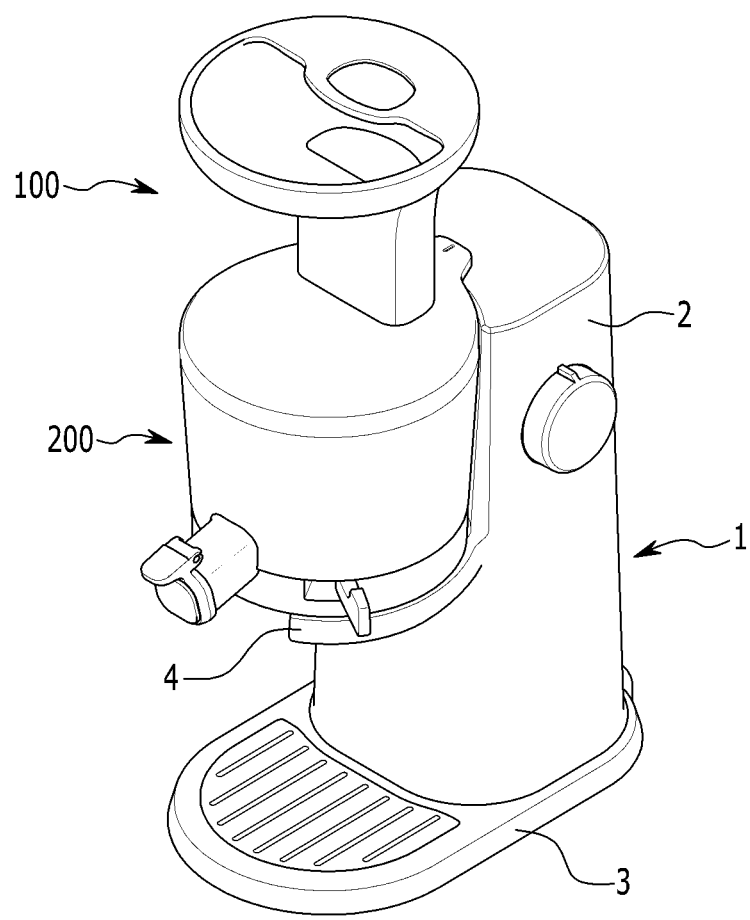
FIG. 1 and FIG. 2 are perspective views of a juice extractor applied with a juice-extracting drum according to an exemplary embodiment of the present invention.

Hereinafter, exemplary embodiments of the present invention with reference to accompanying drawings. This specification is intended to describe the present invention in detail such that a person skilled in the art may easily implement the present invention, and it does not mean that the technical ideas and categories of the present invention are limited to the exemplary embodiments or descriptions disclosed in this specification.

In addition, since each component shown in drawings are illustrated for better understanding and ease of description, the present invention is not necessarily limited to that shown in the drawings, and a size or a shape of a constituent element shown in the drawings may be may be exaggerated for clarity of description and convenience. Therefore, terms specifically defined in consideration of the composition and operation of the present invention may vary depending on the user or operator's intention or convention, and the definition of such terms should be made based on the contents throughout this specification.

In this specification, unless otherwise specified, "upper side", "upper portion", "upper end", or similar terms refer to a side into which a material is inserted, or a portion or an end close thereto. In addition, "lower side", "lower portion", "lower end", or similar terms refer to a side opposite to the side into which a material is inserted, or a portion or an end close thereto.

Hereinafter, a juice-extracting drum according to an exemplary embodiment of the present invention is described in detail with reference to the drawings.

Figure 2:
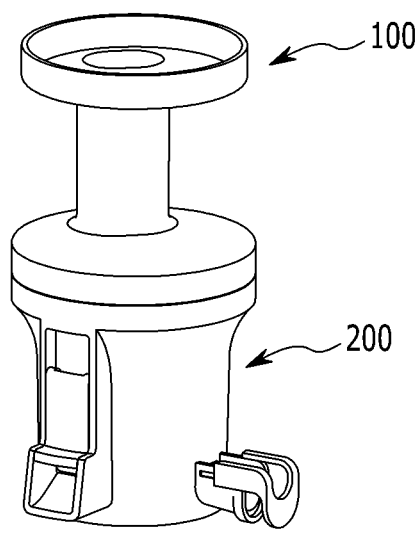
Figure 2:
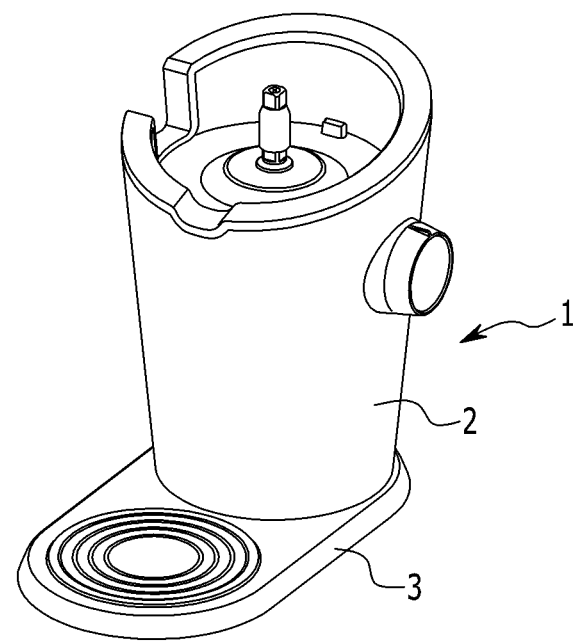

FIG. 1 and FIG. 2 are perspective views of a juice extractor applied with a juice-extracting drum according to an exemplary embodiment of the present invention.

FIG. 1 is an exemplary embodiment of a laterally driven juice extractor applicable with a juice-extracting drum according to the present invention, and the juice extractor may include a main body 1, a hopper 100, a drum housing 200, a screw 300 and a juice-extracting drum 400.

The main body 1 may include an upper support 2, a lower support 3, and a speed reducer container 4. Inside the main body 1, a drive motor that generates driving torque and a speed reducer (not shown) that transmits the driving torque to a drive shaft 6 may be disposed.

The upper support 2 may be formed in a shape corresponding to a part of the exterior circumference of the drum housing 200, to support a lateral portion of the drum housing 200.

The lower support 3 extends from a lower portion of the main body 1 toward an underneath of the drum housing 200, and may be formed in a plate shape. On the lower support 3, a debris cup (not shown) that may hold the debris may be disposed.

The speed reducer container 4 extends in the transverse direction from a center of the main body 1 toward the drum housing 200, and the speed reducer may be disposed therein. The speed reducer container 4 may be formed in a shape corresponding to a bottom surface of the drum housing 200 such that the drum housing 200 may be seated thereon.

Subsequently, as shown in FIG. 2, a upward driven juice extractor according to another exemplary embodiment of the present invention is generally the same as an exemplary embodiment of a juice extractor shown in FIG. 1 described above, while showing difference in that the juice-extracting drum 200 is seated on the upper portion of main body 1 such that the drive shaft 6 of drive motor 5 may transmit power to a screw 300 (refer to FIG. 3) on the same axis.

The main body 1 may include an upper support 2 and a lower support 3. Inside the main body 1, a drive motor that generates driving torque and a speed reducer (not shown) that transmits the driving torque to a drive shaft 6 may be disposed.

The upper support 2 may be formed in a shape corresponding to a part of the bottom surface of the drum housing 200, to accommodate the drum housing 200 on an upper portion and to connect the drive shaft 6 to the screw 300. Furthermore, the drive shaft 6 is configured to be connected to a shaft of the screw 300 through a hole through the center of the drum housing 200.

Figure 3:
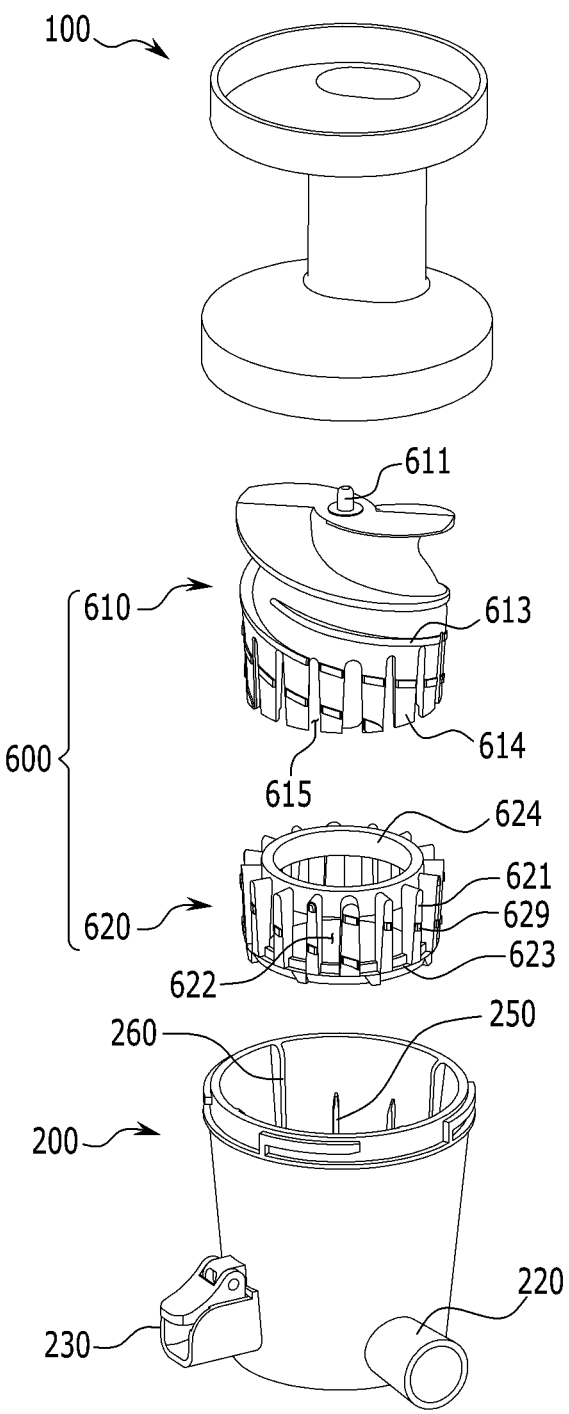
FIG. 3 and FIG. 4 are exploded perspective views of a drum housing according to an exemplary embodiment of the present invention.

The lower support 3 extends from the lower portion of main body 1 toward a juice outlet, and may be formed in a plate shape (FIG. 3 does not illustrate that the direction of lower support 3 extends exactly in the direction toward the juice outlet). On the lower support 3, a juice cup (not shown) that may hold juice may be disposed.

As will be described later, the screw of the juicer of the present invention illustrated in FIG. 1 and FIG is configured as a separable screw in which two modules are assembled, and the drum housing 200 replaces the juice-extracting drum. The drum housing 200 accommodates the separable screw 600 inside, and drive motor (not shown) of main body 1 transmits power to the screw 300 through a drive shaft (not shown). The drive motor includes the speed reducer (not shown), and the speed reducer reduces the rotation speed (approximately 1,800 rpm) of the drive motor, such that the separable screw 600 rotates at a low speed (approximately 80 rpm or less). This enables juice-extracting without destroying nutrients. A juice extractor having such a structure is usually called a vertical low-speed juice extractor.

Figure 4:
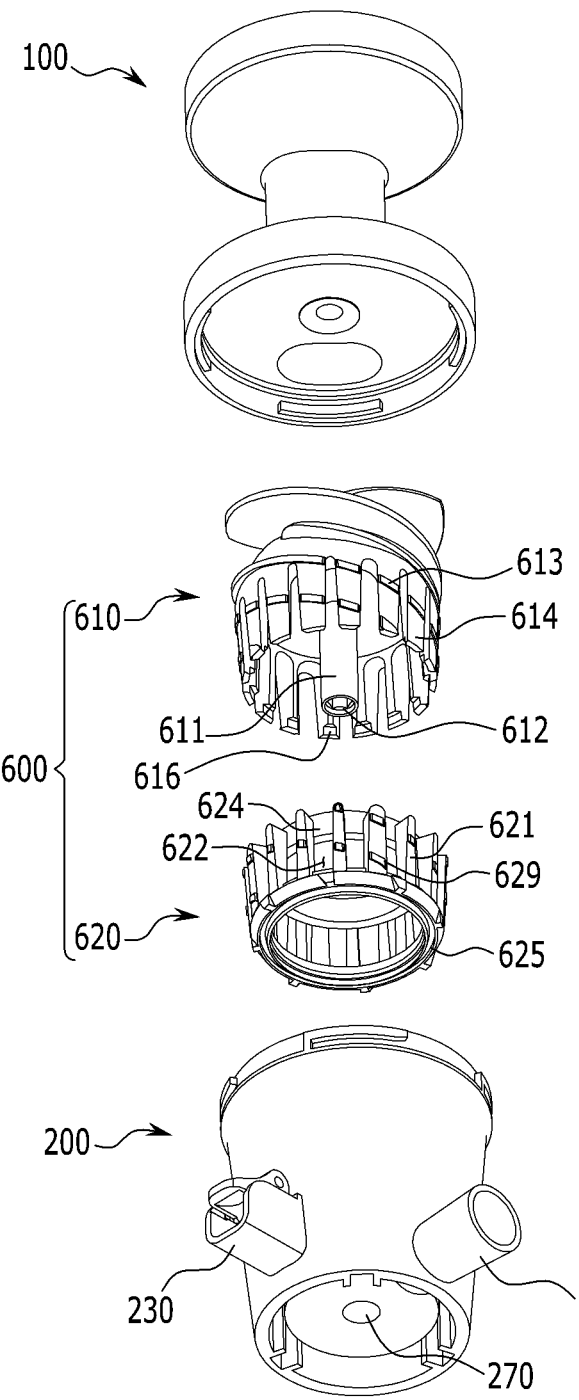

FIG. 3 and FIG. 4 are exploded perspective views excluding the main body in the juice extractor illustrated in FIGS. 1 and 2 according to an exemplary embodiment of the present invention. As shown in FIG. 3 and FIG. 4, the hopper 100 is capable of inserting a juice-extracting target (e.g., vegetables, grains, fruits, etc.) into the inside, and guides the inserted juice-extracting target to the drum housing 200.

The drum housing 200 is formed in a cylinder shape with an upper portion open, and the screw 600 may be disposed therein. A juice outlet 220 and a debris outlet 230 are formed in a lower portion of the drum housing 200. The juice outlet 220 may protrude in a pipe shape on the lower side of the drum housing 200 such that juice may be easily discharged. The debris outlet 230 may be formed on a lower surface of the drum housing 200 such that the debris may be discharged vertically downward from the drum housing 200. The juice outlet 220 may be opened or closed by a juice shutoff mechanism 240, and the debris outlet 230 may be opened or closed by a debris shutoff mechanism 250.

The drum housing 200 is a hollow cylinder or truncated circular cone shape, and may squeeze or crush the juice-extracting target by an interaction with the screw 600. A drum hole 270 is formed in a lower center of the drum housing 200. The drive shaft is inserted into the drum hole 270 and connected to the screw 600 to transmit power to the screw 300. An interior circumference of the drum hole 270 may have a shape corresponding to the shape of the drive shaft such that the drive shaft may be inserted.

The screw 600 is capable of rotational movement by receiving torque from the drive shaft, and squeezes or crushes the juice-extracting target. At an exterior circumference of the screw 600, at least one first spiral protrusion 613 is formed to contact with the drum housing 200. The juice-extracting target is transferred to the lower portion by the first spiral protrusion 613, and the juice-extracting target is squeeze by a narrow gap between the screw 300 and the drum housing 200. For this purpose, the spacing between neighboring first spiral protrusions 613 formed in an upper portion of the screw 600 may be greater than the spacing between neighboring first spiral protrusions 613 formed in a lower portion of the screw 600.

In addition, the upper portion of the screw 600 is inserted and supported in a shaft hole (not shown) formed on the lower surface of the hopper 100 so that the screw 600 is fixed at both the upper and lower directions of the shaft to rotate. Accordingly, vibration of the screw and wear of the device can be prevented, and noise generated when the screw hits the inner wall of the drum housing 200 can be reduced.

Referring to FIGS. 3 and 4, the juice extractor according to the present invention will be described. In the drum housing 200, the separable screw 600 is disposed, and the hopper 100 may be detachably coupled the drum housing 200.

A juice-extracting target (e.g., vegetables, grains, fruits, etc.) is guided and inserted through the hopper 100 into the drum housing 200.

The drum housing 200 is formed in a cylinder shape with an upper portion open, and the separable screw 600 may be disposed therein.

A juice outlet 220 for discharging juice and a debris outlet 230 for discharging debris are formed in a lower portion of the drum housing 200. The juice-extracting target is separated into debris and juice by the drum housing 200 and the separable screw 600, the debris remains in an radially outside of separable screw 600, and the juice moves toward radially inside of separable screw 600. Thereafter, the debris is discharged through the debris outlet 230, and the juice is discharged through the juice outlet 220. At this time, a path through which the juice is discharged and a path through which the debris is discharged are different.

A drum hole 270 is formed in a lower center of the drum housing 200. The drive shaft is inserted into the drum hole 270 and transmits power to the separable screw 600. An interior circumference of the drum hole 270 may have a shape corresponding to the shape of the drive shaft such that the drive shaft may be inserted.

A first rib step 250 and a second rib step 260 may be formed in an interior circumference of the drum housing 200 with a predetermined spacing along circumferential direction. The first rib step 250 and the second rib step 260 may be formed along a vertical direction of the interior circumference of the drum housing, or may be formed in an inclined shape with a predetermined slope less than 90 degree with respect to the vertical direction. Materials may be squeezed or crushed by an interaction of the spiral protrusions 613 and 629, and the rib steps 250 and 260 according to the rotation of the separable screw 600. The second rib step 260 may perform a function that guides the juice-extracting target to the lower portion of the drum housing 200. In addition, the second rib step 260 may perform a function of fixing the accommodation position of the screw 300 in the drum housing 200 and adjusting the juice-extracting space.

The second rib step 260 may be formed in an entire interior surface of the drum housing 200, or may be formed in part of the interior surface of the drum housing 200. That is, the length of the second rib step 260 may be longer than the length of the first rib step 250.

Without these rib steps 250 and 260, the juice-extracting target may stagnate without going down, or the squeezing force or the crushing force may be small or may not occur. In addition, the rib steps 250 and 260 can prevent deformation of the drum housing 200 that may be caused by compression force generated in the process of transferring and crushing the material by the spiral of the screw 600.

In general, the rib steps 250 and 260 serve to allow the material inserted into the drum housing 200 to move downward by being pinched in a narrow portion in contact with the screw 600. The rib steps 250 and 260 may perform the function of squeezing the material well together with the screw 600 while lowering the material. Therefore, the rib steps 250 and 260 do not necessarily have to be formed in the length direction of the drum housing 200, and may be implemented, in a shape crossing the spiral 310 of the screw 300, in an inclined shape with a predetermined slope with respect to the length direction for efficient transport and squeeze of the material.

In addition, the second rib step 260 is formed lengthily along the length direction on the interior circumference of the drum housing 200, and may provide, as well as the function to guide and squeeze the material, a reinforcing function that prevents deformation of the drum housing 200 by the squeezing force generated while the material is transferred and squeezed by the spiral of the screw 600, and an adjusting function to adjust accommodation position of the screw 600 within the drum housing 200 and to adjust a juice-extracting space.

In addition, although the protrusion height of the second rib step 260 may be configured to have a same height from the upper portion to the lower portion, the protrusion height may be gradually lowered from the upper portion toward the lower portion, or at least one stepped portion may be formed in the middle portion of the second rib 260 in the length direction. Taking the stepped portion as a reference, a protrusion height of an upper portion of the second rib step 260 may be lower than a protrusion height of a lower portion of the second rib step 260.

The separable screw 600 is capable of rotational movement by receiving torque from the drive shaft, and squeezes or crushes the juice-extracting target.

Hereinafter, an exemplary embodiment of the separable screw applicable in FIG. 3 and FIG. 4 will be described with reference to FIG. 5 and FIG. 6.

The separable screw 600 according to an exemplary embodiment of the present invention may include a first module 610 and a second module 620 formed as a cylindrical shape. In an external circumferential surface of the first module 610 having hollow space, a first spiral protrusion 613 (hereinafter, may be refer to 'screw spiral') is formed by slanting with respect to length direction, and a plurality of slit 615 is formed lengthily along the length direction. In the present exemplary embodiment, a plate portion without the slit 615 in the first module 610 is called a bar 614. In an external circumferential surface of the second module 620 formed as a cylindrical shape, a plurality of rib 621 is formed as a shape corresponding to the slit 615.

On an external circumferential surface of the rib 621, a second spiral protrusion 629 (hereinafter, may be refer to 'screw spiral') may be formed. Depending on the shape of the screw spiral and the position of rib 621, the second spiral protrusion 629 may not be formed on the external circumferential surface of some ribs 621.

When the first module 610 and the second module 620 are assembled, since an interior diameter of the first module 610 is greater than an exterior diameter of the second module 620, the first module 610 is assembled by wrapping the second module 620. At this time, as the rib 621 of the second module 620 is inserted into the slit 615 of the first module 610, a predetermined gap between the 615 and the rib 621. Juice moves in an inside of the separable screw 600 through the gap, and debris separated from juice is collected in a lower portion between the separable screw 600 and the drum housing 200 and discharged outside.

In an exemplary embodiment of the present invention, when the first module 610 and the second module 620 are assembled, the screw spiral may be continuously formed on an external circumferential surface of the separable screw 600. In another exemplary embodiment, although the screw spiral may be cut off little by little, the screw spiral is generally continuously formed. For this purpose, a diameter of the bar 614 and a diameter of the rib 621 may be same, and a protrusion height of the screw spiral protrusions 613 and 629 may be same each other.

Meanwhile, a width of the bar 614 may have a shape that narrows toward the center of the radial direction. In this case, the gap formed between the slit 615 of the first module 610 and the rib 621 of the second module 620 is configured to widen toward the center of the radial direction, to prevent a problem that the gap is block by the debris or the flow of the juice is hindered in the juice-extracting process. In one aspect, in order to make the width of the bar 614 narrower toward the center in the radial direction, the cross-section of bar 614 formed in the first module 610 may be generally composed of a semicircular shape, an oval shape, or a trapezoid shape.

In the second module 620 of the separable screw 600, a plurality of screw groove 622 is formed between a plurality of ribs 621. In one aspect, the interior circumference of the screw groove 622 may be entirely blocked. In another aspect, a part of the interior circumference of the screw groove 622, particularly the lower interior circumference of the screw groove 622, may be opened. Also, a spatial gap may be formed between the interior circumference of the screw groove 622 and the interior circumference of the bar 614. Juice may move to a lower portion between the first module 610 and the second module 620 through the spatial gap. A juice discharge hole 628 may be formed at a lower portion of the screw groove 622. The juice collected at the lower portion between the first module 610 and the second module 620 may flow into an inside of the separable screw 600 through the juice discharging hole 628. On the other hand, when the lower interior circumference of the screw groove 622 is opened, the opened interior circumference may perform a function as the juice discharging hole 628.

A shaft through-hole 630 into which the screw shaft 611 is fitted may be formed on an upper surface 627 of the second module 620. The shaft through-hole 630 may be a square hole in order to fix the coupling position of the first module 610 and the second module 620 and prevent relative rotation of the first module 610 and the second module 620. The shaft through-hole 630 is illustrated as the square hole in FIG. 5 to FIG. 11, but the shape of the shaft through-hole 630 is not limited to that illustrated. In this specification, the first module 610 and the second module 620 may be fixed in four different positions by the screw shaft 611 and the shaft through-hole 630 formed as a squared shape.

A seating groove 625 may be formed on the lower portion of the second module 620 so that the separable screw 600 is seated on the drum housing 200. On the lower surface of the drum housing 200, a seating protrusion (not shown) corresponding to the seating groove 625 may be protruded toward an upper direction. By coupling the seating groove 625 to surround the seating protrusion, it is possible to prevent the debris separated in the juice process from flowing into the screw 600.

As described above, the spatial gap may be formed between the interior circumference of the screw groove 622 and the interior circumference of the bar 614 (i.e., between the interior circumference of the first module 610 and the external circumferential surface of the second module 620). The spatial gap may become wider toward the lower side of the separable screw 600. By the spatial gap, it is possible to acquire a space in which the juice inflowing between the first module 610 and the second module 620 can flow.

Also, the first step 616 may be formed at the bottom of the bar 614 of the first module 610, and correspondingly, the second step 623 may be formed on a lower portion of the rib 621.

The second step 623 of the second module 620 and the first step 616 of the first module 610 are coupled to withstand the pressure transmitted to the screw 600 and prevent the debris from inflowing into the screw 600.

Figure 5:
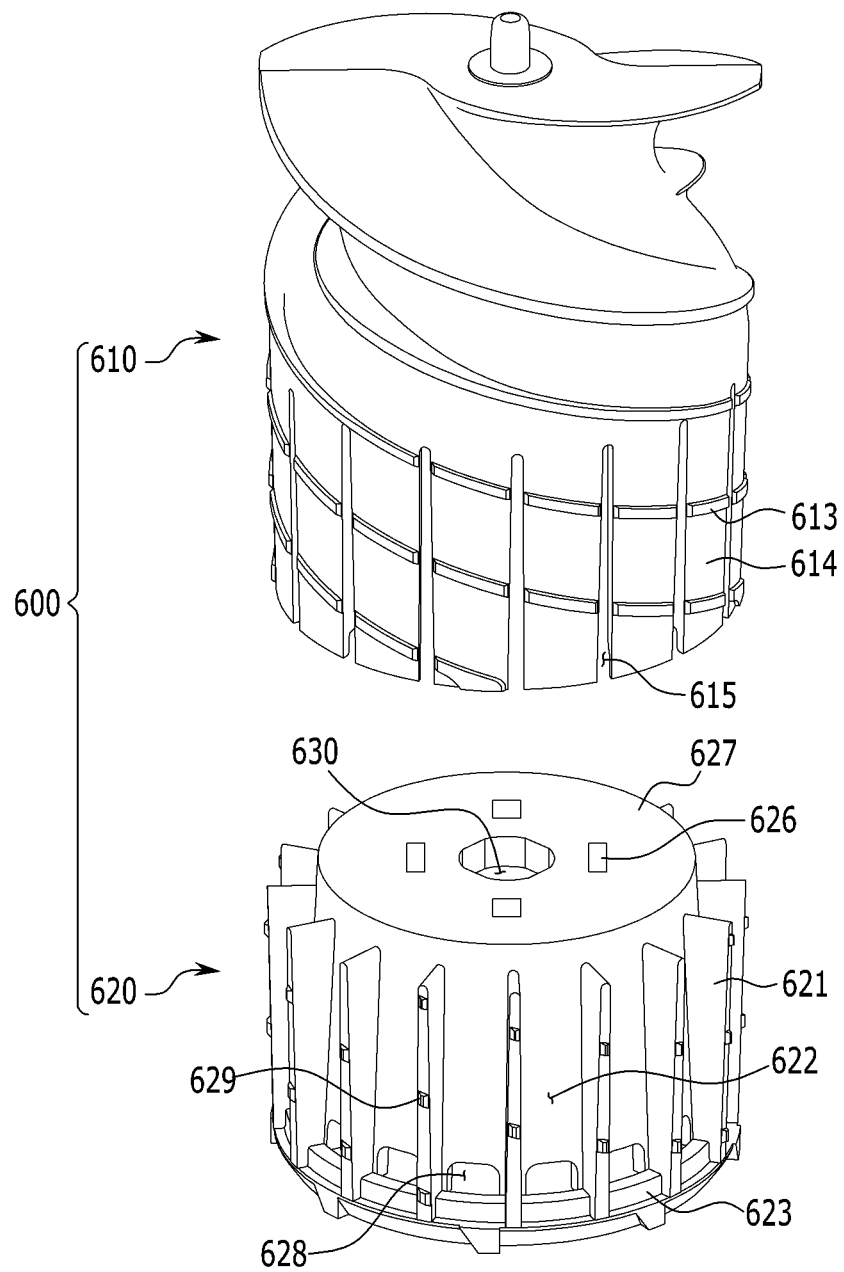
FIG. 5 and FIG. 6 are exploded perspective views of a separable screw according to an exemplary embodiment of the present invention.
Figure 6:
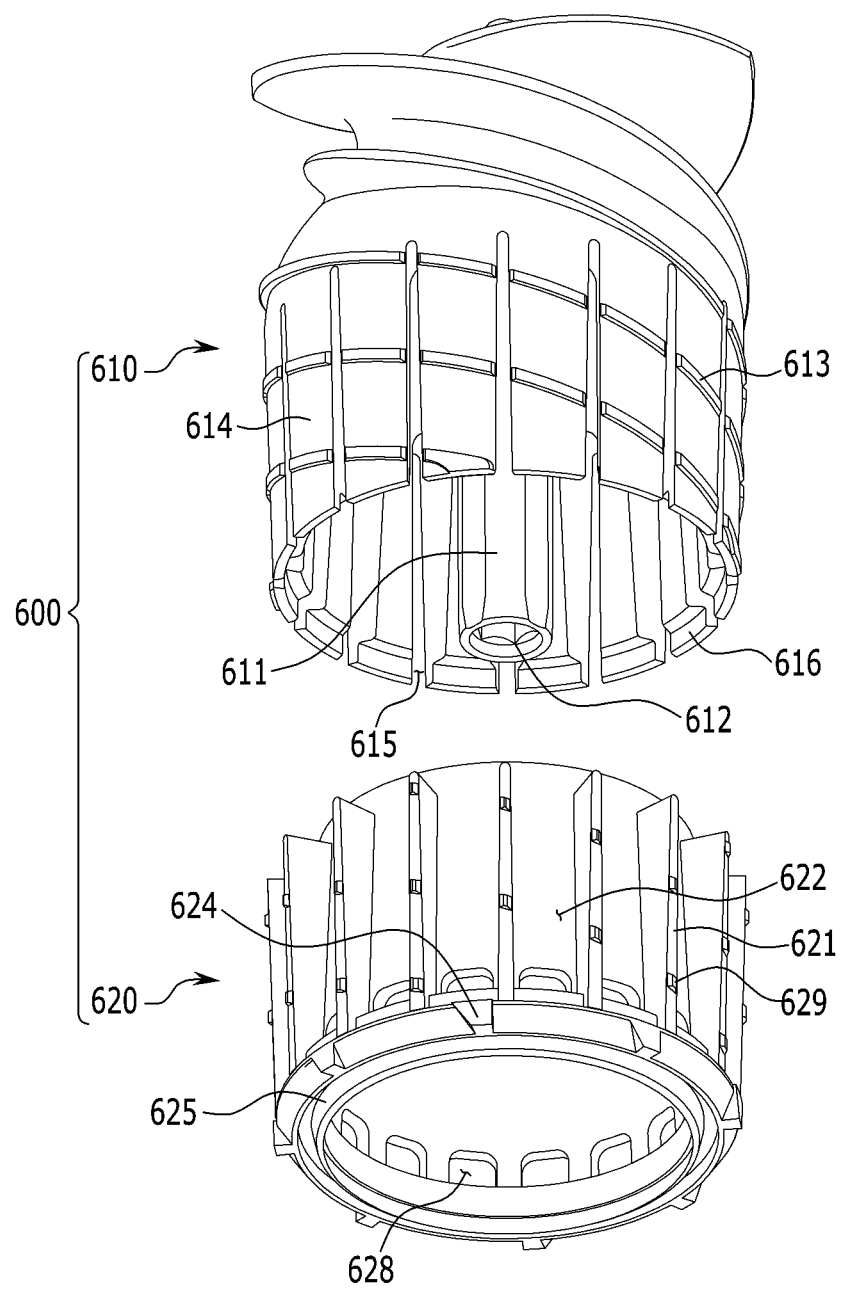

Referring to FIG. 5 and FIG. 6, the separable screw according to an exemplary embodiment of the present invention will be described in more detail. The separable screw 600 of the present invention may include a first module 610 and a second module 620. The first module 610 and the second module 620 may be detachably coupled.

In the inner center of the first module 610, a screw shaft 611 is disposed. The screw shaft 611 is further upwardly protruded from the upper surface of the separable screw 600 and may be inserted into a receiving hole formed in the bottom surface of the hopper 100.

A screw hole 612, which receives the torque of the drive shaft, is drilled under the screw shaft 611.

On the external circumferential surface of the first module 610, at least one screw spiral 613, which contacts the drum housing 200, is formed.

In the first module 610, a plurality of bars 614 separated by a plurality of slits 615 are formed. A plurality of bars 614 may be formed in the entire length of the first module 610, or may be formed only in part of the length direction of the first module 610. A plurality of slits 615 is formed by a plurality of bars 614.

To fix the coupling position with the second module 620, a plurality of bars 614 may include a bar 614 having a relatively narrow width and a bar 614 having a relatively wide width.

The width of the bar 614 may have a shape that narrows toward the center of the radial direction of the first module 610. Accordingly, it is possible to prevent a problem that the gap is block by the debris or the flow of the juice is hindered in the juice-extracting process. For this purpose, the cross-section of bar 11 may be generally composed of a semicircular shape, an oval shape, or a trapezoid shape.

As described above, the first step 616 may be formed at a lower portion of the bar 614. The second step 623 of the second module 620 and the first step 616 of the first module 610 are coupled to withstand the pressure transmitted to the screw 600 and prevent the debris from inflowing into the screw 600.

The second module 620 may be configured to be inserted into the first module 610. The second module 620 is generally a cylinder shape, and the upper/lower side may be opened.

The second module 620 includes a plurality of ribs 621 protruded to a radially exterior direction, and a plurality of screw grooves 622 are formed by the plurality of ribs 621. A predetermined gap may be formed between the slit 615 and rib 621 by inserting the rib 621 into the slit 615 between the bars 614. The juice flows into radially interior direction of the separable screw 600 through the gap, and debris may be remained and separated between the separable screw 600 and the drum housing 200. The remained debris between the separable screw 600 and the drum housing 200 moves downwardly through a spatial gap between the separable screw 300 and the drum housing 200.

On the external circumferential surface of rib 621, a second spiral protrusion 629, which contacts the drum housing 200 may be formed. The coupling positions of the first module 610 and the second module 620 may be constant (or, may be formed in a predetermined position) such that the first spiral protrusion 613 formed on the first module 610 and the second spiral protrusion 629 formed on the second module 620 coincide. That is, assuming that an angle formed by a reference position of the first module 610 and a reference position of the second module 620 along the circumference direction is 0 degree at a position where the first module 610 and the second module 620 are completely coupled, the first module 610 and the second module 620 may be completely coupled only when the reference position of the first module 610 and the second module 620 are formed in the predetermined angle (e.g., 0 degree, 90 degrees, 180 degrees, or 270 degrees) along the circumference direction. At this time, the first spiral protrusion 613 formed on the first module 610 and the second spiral protrusion 629 formed on the second module 620 may coincide (i.e., forming a continuous screw spiral). In order to make the coupling position of the first module 610 and the second module 620 constant, a relatively narrow space and a relatively wide space between the plurality of ribs 621 may be periodically formed at predetermined angles along the circumferential direction. A relatively wide bar 614 may be inserted in the relatively wide space between a plurality of ribs 621. Accordingly, when the first module 610 and the second module 620 are coupled, the first spiral protrusion 613 formed on the first module 610 and the second spiral protrusion 629 formed on the second module 620 are aligned, so that the screw spiral may be continuously formed.

Alternatively, the second spiral protrusion 629 may not be formed on the external circumferential surface of rib 621. In this case, it is possible to achieve the same or similar juice-extracting efficiency by narrowing the width of rib 621, as compared to the case where the second spiral protrusion 629 is formed on the external circumferential surface of rib 621.

A ring-shaped flange 624 may be formed on the lower side of rib 621. The flange 624 supports a distance between the plurality of ribs 621 to be fixed.

A seating groove 625 may be formed on the lower side of the second module 620 so that the separable screw 600 is seated on the drum housing 200. A packing may be dispose in the seating groove 625. Accordingly, it is possible to prevent the debris from flowing into the separable screw 600 in the juice-extracting process.

As described above, the spatial gap may be formed between the interior circumference of the first module 610 and the external circumferential surface of the second module 620. The spatial gap may become wider toward the lower side of the separable screw 600. By the spatial gap, it is possible to acquire a space in which the juice inflowing between the first module 610 and the second module 620 can flow.

As shown in FIG. 5 and FIG. 6 according to an exemplary embodiment of the present invention, the separable screw 600 may be formed with a magnet accommodating portion 626 on the upper surface 627 of the second module 620. Since a magnet is disposed in the magnet accommodating portion 626 and a magnet having opposite polarity to the magnet disposed in the magnet accommodating portion or a magnetic substance (e.g., metal plate) is disposed in an inside of the first module 610, the second module 620 may be fixedly coupled to the first module 620. Therefore, the second module 620 and the first module 610 are not easily separated when the second module 620 is coupled to the first module 610.

Figure 7:
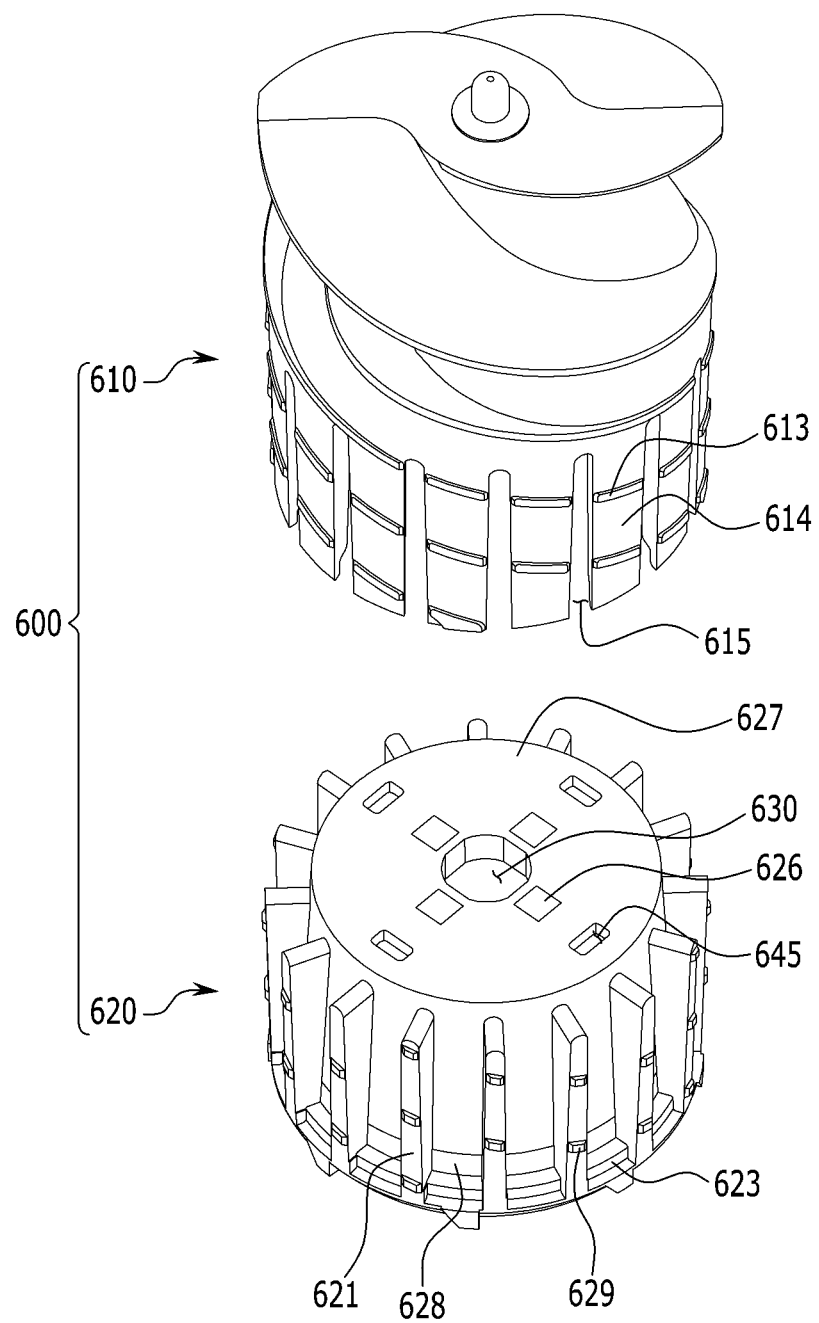
FIG. 7 and FIG. 8 are exploded perspective views of a separable screw according to another exemplary embodiment of the present invention.
Figure 8:
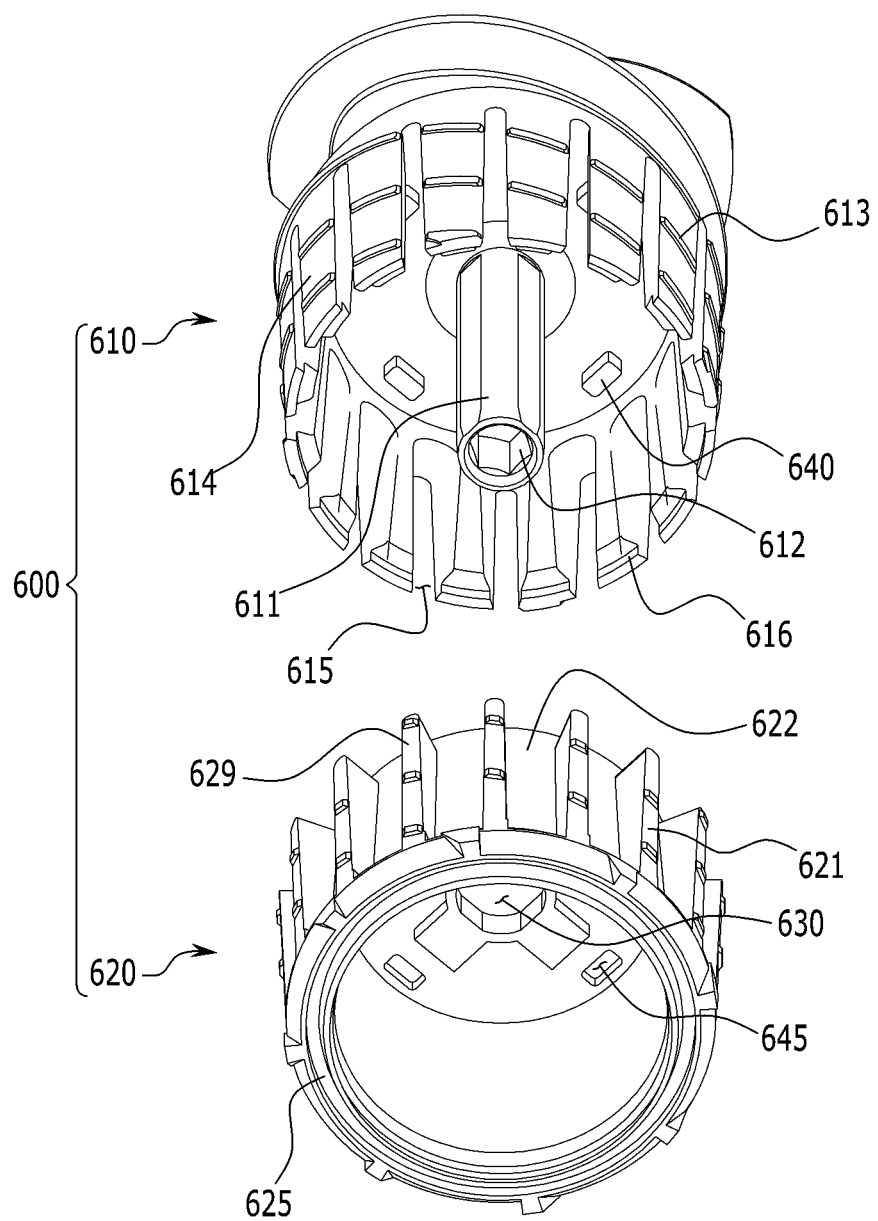

As shown in FIG. 7 and FIG. 8, in order to fix the coupling position of the first module 610 and the second module 620, a key protrusion 640 may be formed in an upper portion of the first module 610, and a key groove 645 with which the key protrusion 640 is coupled may be formed in an upper portion of the second module 620. By inserting the key protrusion 640 into the key groove 645, it is possible to limit the coupling position, relative rotation, and tilting of the first module 610 and the second module 620.

Figure 9:
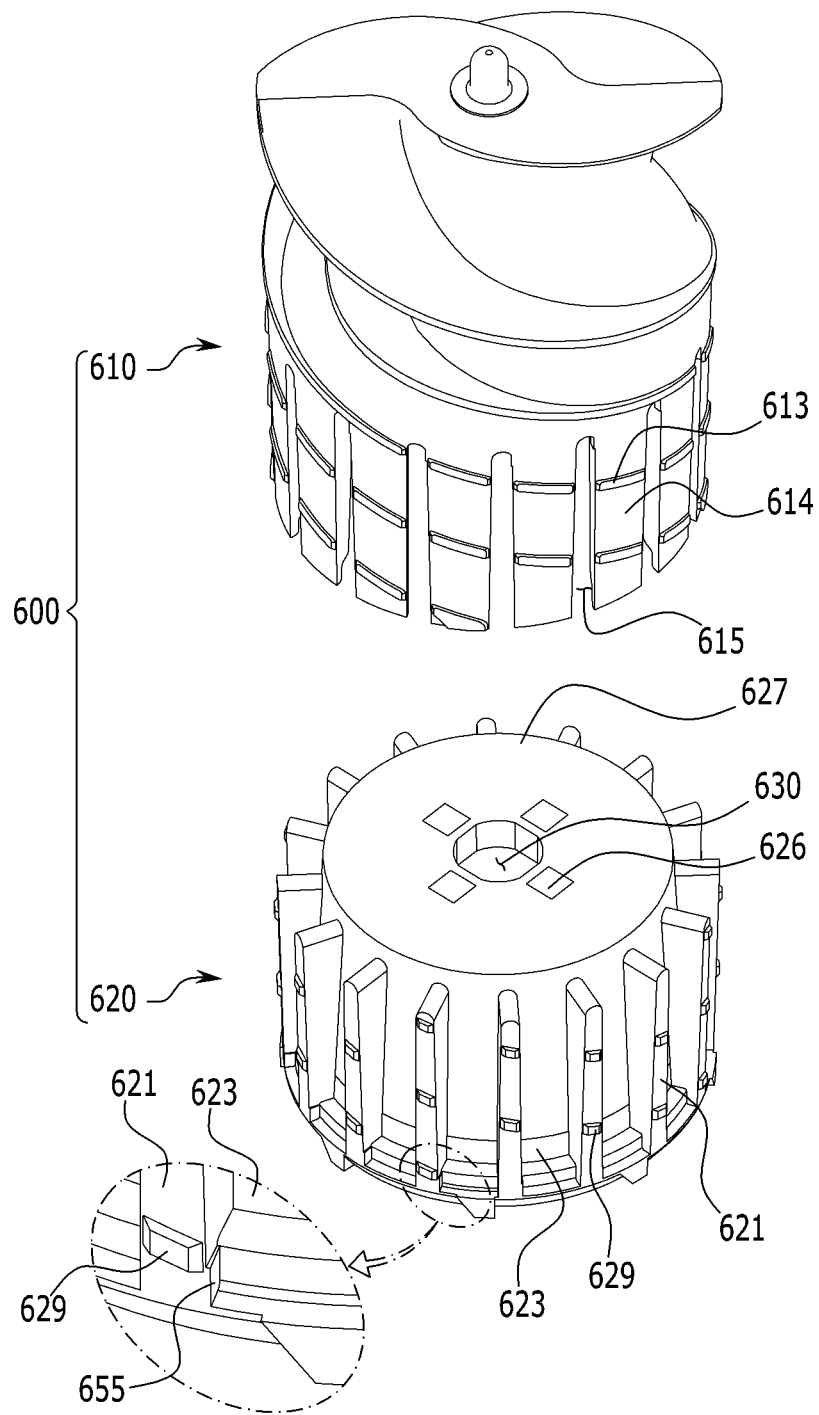
FIG. 9 and FIG. 10 are exploded perspective views of a separable screw according to still another exemplary embodiment of the present invention.
Figure 10:
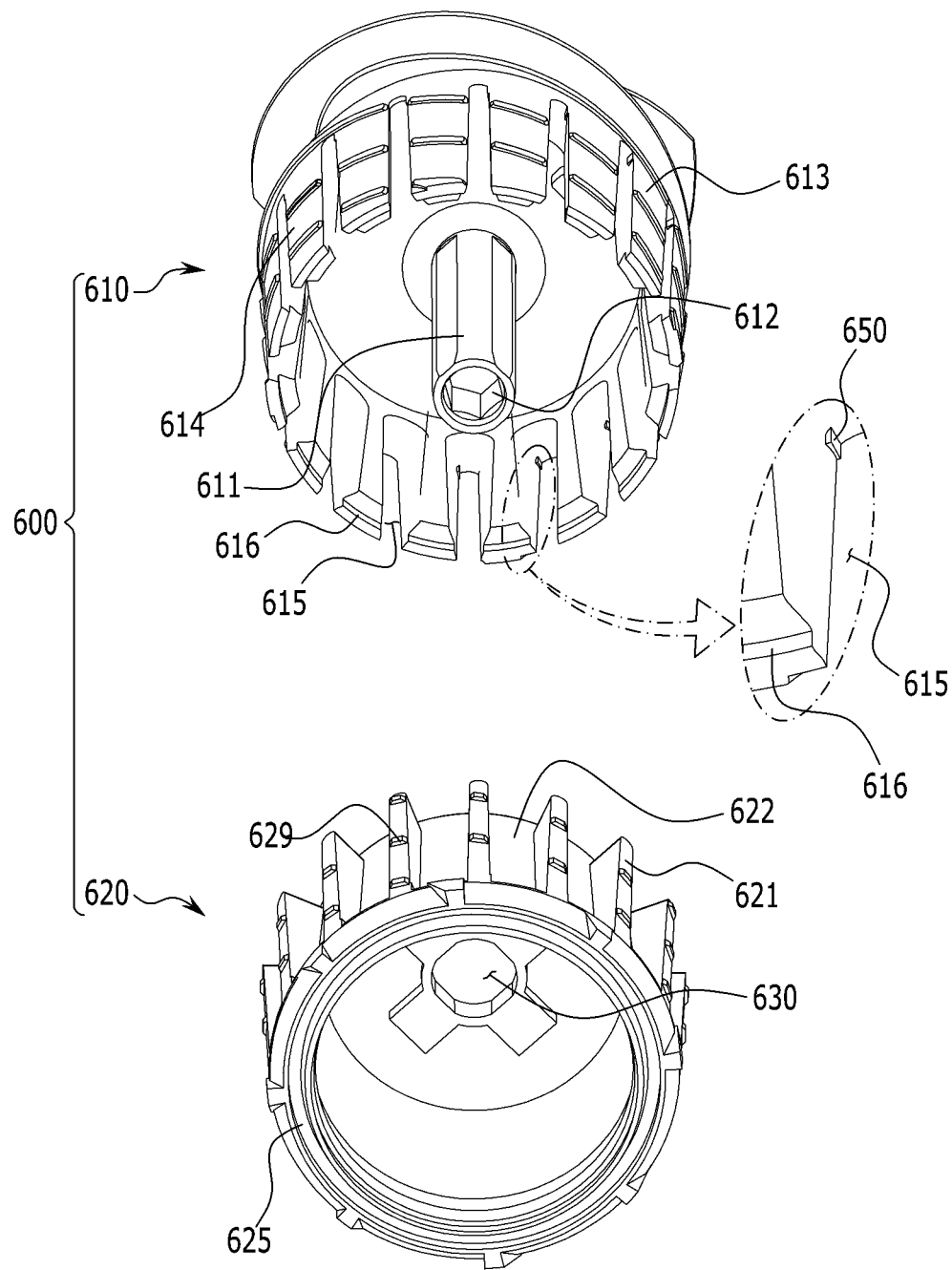

As shown in FIG. 9 and FIG. 10, another second modified exemplary embodiment of the separable screw 600 may be formed with a first bar step 650 on an upper side of the bar 614. In addition, a second bar step 655 may be formed on a lower side of the rib 621. The size of the gap between the slit 615 and the rib 621 may be changed when the separable screw 600 is rotated during the juice-extracting process. In the juice-extracting process, the size of the gap may be kept constantly by the first bar step 650 and the second bar step 655.

Figure 11:
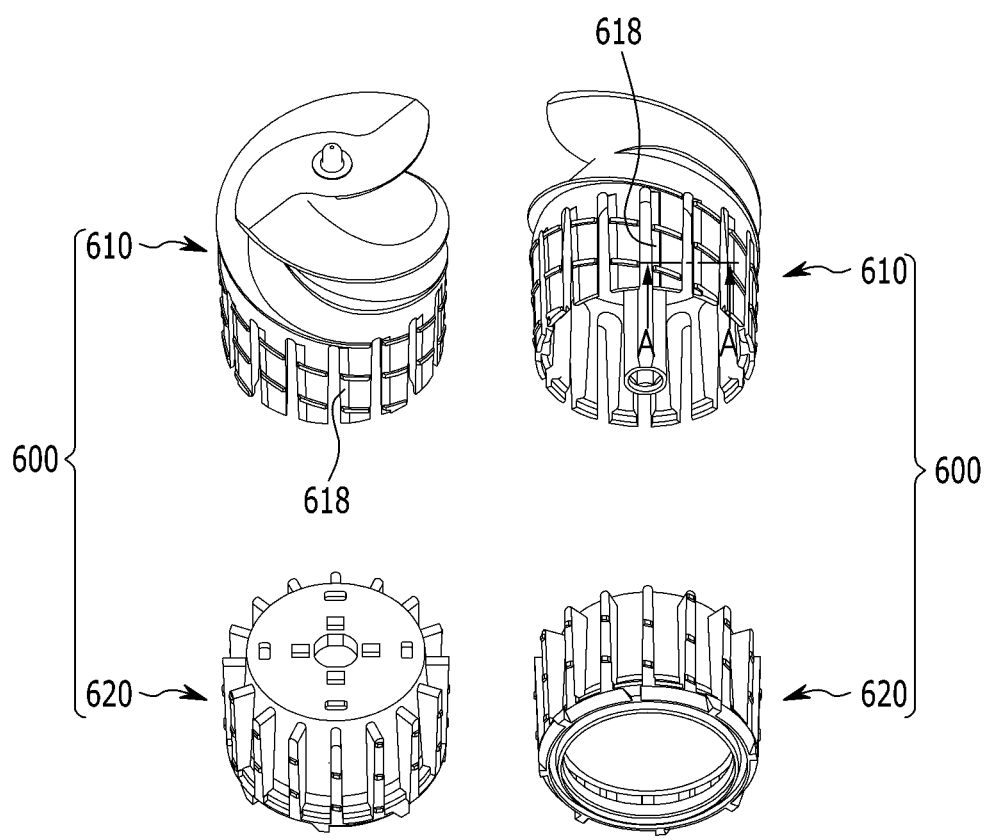
FIG. 11 is another exemplary variation of the separable screw illustrated in FIG. 5 and FIG. 6.

As can be seen in FIG. 11, an inclined portion 618 may be formed by cutting off a side edge adjacent to the slit 615 of the first module 610. When the inclined portion 618 is formed in this way, the juice-extracting target is smoothly passed over and debris is prevented from entering the gap of the separable screw.

Figure 12:
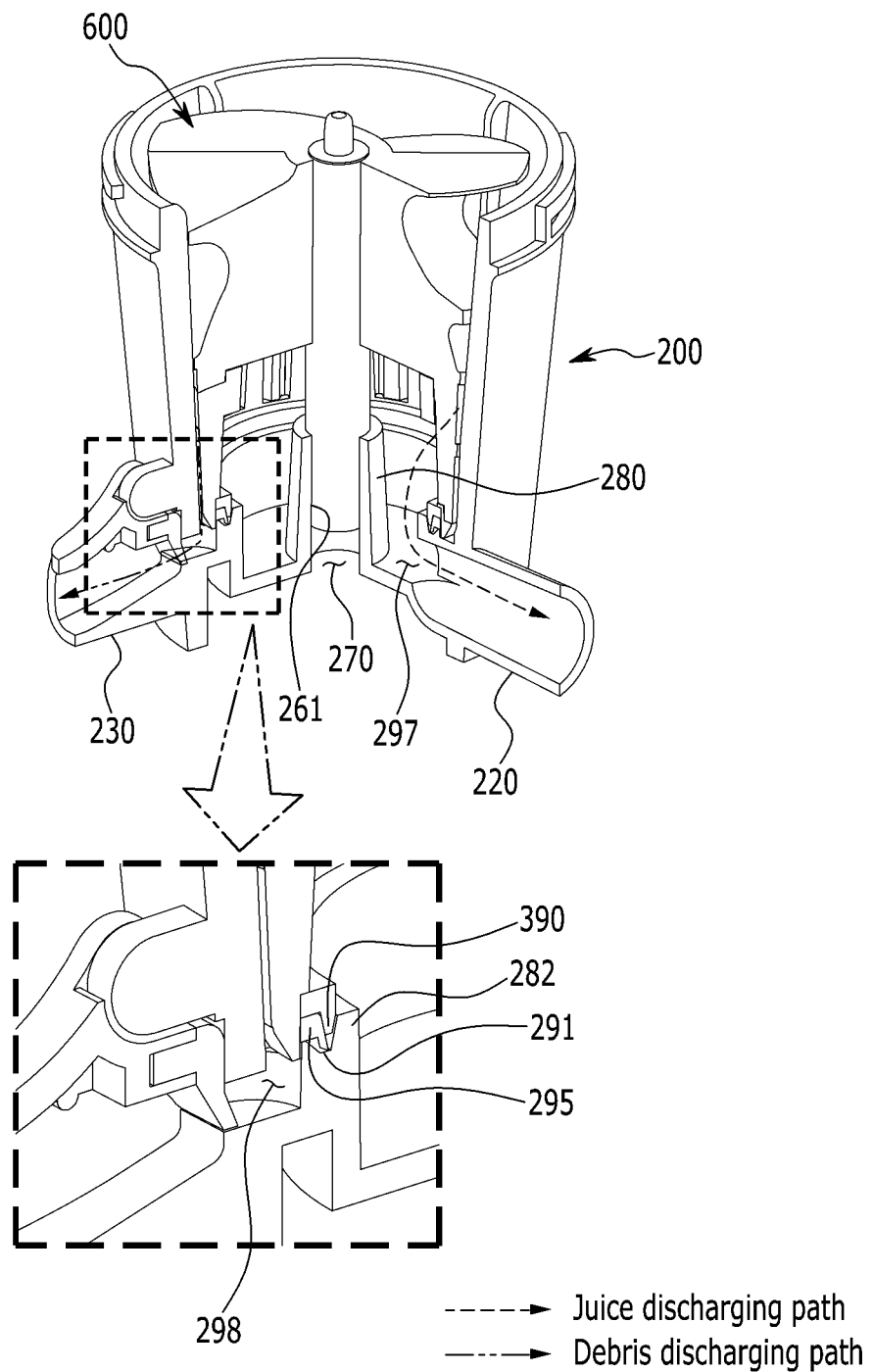
FIG. 12 is partial cross-sectional view of a drum housing assembly applied with a separable screw according to an exemplary embodiment of the present invention.

FIG. 12 is partial cross-sectional view of a drum housing assembly applied with a separable screw according to an exemplary embodiment of the present invention.

The left cross-section of FIG. 12 is illustrated so that a debris passage through which the filtered debris is discharged after being juice-extracted between the separable screw 600 and the drum housing 200 is well understood. And the right cross-section of FIG. 12 is illustrated so that a juice passage through which the filtered juice squeezed in the separable screw 600 is discharged is well understood.

In addition, a drum hole 270 is formed in center of the interior bottom surface of the drum housing 200. A packing 261 for water resistance may be included at the interior circumference of the drum hole 260, and depending on the needs of the design, a cylinder 280 that protrudes toward and is inserted into the central space inside the separable screw 600 may be included. A guiding step 282 where a lower end ring 390 of the separable screw 600 may be seated is formed around the drum hole 260. The guiding step 282 is formed at a predetermined height on the bottom surface of the drum housing 200 to be inserted into the interior circumference of a lower end ring 390 of the separable screw 600. And a guiding groove 291 may be formed on an upper surface of the guiding step 282. While the drum housing is fixedly supported, the debris does not enter the drive shaft.

The juice is extruded into an inner space of the separable screw, and collected in a juice extracting groove 297 formed in a bottom surface of the drum housing. The juice extracting groove 297 may be formed around the cylinder 280. The juice collected in the juice extracting groove 297 may be discharged outside through a juice outlet 220. An outer wall of the juice extracting groove 297 may be an annular guide step protruded on a bottom surface of the drum housing, and an inner wall of the juice extracting groove 297 may be the cylinder 280.

In addition, a debris extracting groove 298 is formed radially exterior direction of the juice extracting groove 297. The waste discharge groove 298 fluidly communicates with the debris outlet 230. That is, debris excluding juice extracted between the separable screw 600 and the drum housing 200 moves downward between the separable screw 600 and the interior circumference of the drum housing 200, and flows along the debris extracting groove 289 and is discharged outside through the debris outlet 230.

As described above, according to the present invention, it is possible to achieve a simple configuration and reduce manufacturing cost by removing the conventional netted drum. In addition, by removing the conventional netted drum, cleaning is easy and juice-extracting efficiency may be improved.

In addition, according to the exemplary embodiment of the present invention, it is possible to smoothly transfer the material by the separable screw in the squeezing process, to increase the juice-extracting efficiency through fine crush and squeeze of the material, and to smoothly insert the material.

In addition, according to the exemplary embodiments of the present invention, it is possible to prevent the problem of debris hindering the flow of the extracted juice by preventing debris from being caught in the juice-extracting drum in the juice-extracting process.

Furthermore, it is possible to prevent deformation of the slit of the separable screw in the juice-extracting process by forming the separable screw from a rigid material.

In addition, the separable screw according to an exemplary embodiment of the present invention is configured to combine two modules in an up and down direction, and assembly and disassembly of the two modules becomes easy and cleaning becomes easy.

In addition, the debris is prevented from being stuck in the gap formed between the two modules by the inclined portion formed in the first module, thereby improving the juice-extracting efficiency.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A separable screw comprising:
   a first module includes a plurality of bars separated by a plurality of slits; and
   a second module formed with a plurality of ribs inserted into a corresponding plurality of slits of the first module;
   wherein the first module and the second module are detachably coupled, and the plurality of ribs is inserted into the corresponding plurality of slits such that a gap is formed between each of the plurality of ribs and the corresponding plurality of slits when the second module is inserted into and coupled with the first module, and
   wherein at least one spiral protrusion is formed on at least one of the plurality of bars or at least one of the plurality of ribs.

2. The separable screw of claim 1, wherein:
   the spiral protrusion includes a first spiral protrusion formed on an external circumferential surface of the bar, and a second spiral protrusion formed on an external circumferential surface of rib, and
   the first spiral protrusion of the bar and the second spiral protrusion of the rib forms a continuous screw spiral when the second module is inserted into and combined with the first module.

3. The separable screw of claim 1, wherein a lower portion of the second module is opened, and an upper portion of the second module is closed.

4. The separable screw of claim 3, wherein
   a screw shaft is formed in an inner center of the first module, and
   a shaft through-hole corresponding to the screw shaft is formed on an upper surface of the second module such that the screw shaft is fitted.

5. The separable screw of claim 4, wherein the screw shaft is formed as a polygonal shape.

6. The separable screw of claim 3, wherein
   a key protrusion is formed in an upper portion of the first module, and
   a key groove into which the key protrusion is coupled is formed in an upper portion of the second module.

7. The separable screw of claim 3, wherein
   a magnet accommodating portion in which a magnet is disposed is formed in an upper surface of the second module, and
   a magnet having opposite polarity to the magnet disposed in the magnet accommodating portion or a magnetic substance is disposed in an inside of the first module.

8. The separable screw of claim 1, wherein a width of the bar have a shape that narrows toward the center of the radial direction.

9. The separable screw of claim 1, wherein a spatial gap is formed between an interior circumferential surface of the first module and an external circumferential surface of the second module.

10. The separable screw of claim 1, wherein screw grooves are formed between the plurality of ribs.

11. The separable screw of claim 10, wherein a juice discharge hole is formed at a lower portion of the screw groove.

12. The separable screw of claim 1, wherein
   a seating groove is formed on a lower portion of the second module, and
   a packing is disposed in the seating groove.

13. The separable screw of claim 1, wherein
   a first step is formed at a low portion of the bar, and a second step corresponding to the first step is formed on a lower portion of the rib.

14. The separable screw of claim 1, wherein a first bar step is formed on an upper side of the bar.

15. The separable screw of claim 14, wherein a second bar step is formed on a lower side of the rib.

16. The separable screw of claim 1, wherein an inclined portion is formed by cutting off a side edge adjacent to the slit of the first module.

17. The separable screw of claim 2, wherein
the bars include a bar having a relatively narrow width and a bar having a relatively wide width, and
a relatively narrow space into which the bar having the relatively narrow width is inserted and a relatively wide space into which the bar having the relatively wide width is inserted are formed between the plurality of ribs are formed between the plurality of ribs.

18. The separable screw of claim 17, wherein the relatively narrow space and the relatively wide space are periodically formed at predetermined angles along the circumferential direction.

19. The separable screw of claim 1, wherein a ring-shaped flange for supporting a distance between the plurality of the ribs is formed on an lower side of the rib.

20. A juice extractor, comprising:
the separable screw according to claim 1; and
a drum housing accommodating the separable screw, formed with at least on rib step on an interior circumference in length direction therein, formed with a drum hole on a bottom surface thereon, formed with a juice outlet for discharging juice and a debris outlet for discharging debris with a predetermined spacing, formed with a juice extracting groove fluidly communicated with the juice outlet of the bottom surface thereon, and formed with a debris extracting groove fluidly communicated with the debris outlet radially exterior direction of the juice extracting groove; and a main body including a drive shaft being inserted in the drum hole and transmitting power to the separable screw.

21. The juice extractor of claim 20, wherein the rib step includes
a first rib step having a relatively short length, and
a second rib step having a relatively long length.

22. The juice extractor of claim 20, wherein the juice extracted between the separable screw and the drum housing is extruded into an inner space of the separable screw through the gap between the rib of the plurality of ribs and the slit of the plurality of slits, collected in the juice extracting groove, and discharged outside though the juice outlet.

23. The juice extractor of claim 20, wherein the debris excluding the juices extracted between the separable screw and the drum housing moves downward between the separable screw and the drum housing, flows along the debris extracting groove, and is discharged outside through the debris outlet.

* * * * *